(12) United States Patent
Tailliet (10) Patent No.: US 12,505,884 B2
(45) Date of Patent: *Dec. 23, 2025

(54) LATCH DEVICE, IN PARTICULAR FOR ROW DECODING AND COLUMN DECODING OF AN EEPROM MEMORY PLANE

(71) Applicant: STMICROELECTRONICS (ROUSSET) SAS, Rousset (FR)

(72) Inventor: Francois Tailliet, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 195 days.

This patent is subject to a terminal disclaimer.

(21) Appl. No.: 18/324,850

(22) Filed: May 26, 2023

(65) Prior Publication Data

US 2023/0402102 A1    Dec. 14, 2023

(30) Foreign Application Priority Data

Jun. 8, 2022 (FR) ..................................... 2205502

(51) Int. Cl.
*G11C 16/12* (2006.01)
*G11C 16/08* (2006.01)
*G11C 16/30* (2006.01)

(52) U.S. Cl.
CPC .............. *G11C 16/12* (2013.01); *G11C 16/08* (2013.01); *G11C 16/30* (2013.01)

(58) Field of Classification Search
CPC ......... G11C 16/12; G11C 16/08; G11C 16/30; G11C 8/08; G11C 8/10; H03K 19/20; H03K 3/0375
See application file for complete search history.

(56) References Cited

U.S. PATENT DOCUMENTS

| | | | |
|---|---|---|---|
| 5,434,815 | A | 7/1995 | Smarandoiu et al. |
| 5,917,770 | A | 6/1999 | Tanaka |
| 2001/0021128 | A1 | 9/2001 | Kim |
| 2003/0223271 | A1 | 12/2003 | Byeon et al. |
| 2009/0002027 | A1 | 1/2009 | Lee |

(Continued)

OTHER PUBLICATIONS

SR Latch supporting documentation: All About Circuits (Year: 2022).*
All About Circuits; "The S-R Latch" (Year: 2022).*

*Primary Examiner* — Alexander Sofocleous
*Assistant Examiner* — James S Wells
(74) *Attorney, Agent, or Firm* — Seed Intellectual Property Law Group LLP (57) ABSTRACT

The latch device includes an RS type latch flip-flop capable of being supplied between a first supply voltage and a second supply voltage which is lower than the first supply voltage and having first and second flip-flop inputs and a flip-flop output connected to the output terminal. A control module positions the latch flip-flop in a set state or in a reset state when the first supply voltage has a first value which is lower than the low voltage then, the latch flip-flop being positioned, confers the high voltage on the first supply voltage and the low voltage on the second supply voltage and outputs and maintains the high voltage or the low voltage on the flip-flop output while avoiding outputting a prohibited logic state at the two flip-flop inputs.

17 Claims, 7 Drawing Sheets

(56) References Cited

U.S. PATENT DOCUMENTS

| 2016/0148697 | A1* | 5/2016 | Tailliet | G11C 5/025 |
| | | | | 365/185.11 |
| 2019/0109588 | A1* | 4/2019 | Lee | H03K 19/017509 |
| 2020/0342943 | A1 | 10/2020 | Tailliet et al. | |
| 2024/0087652 | A1 | 3/2024 | Tailliet | |

* cited by examiner

LATCH DEVICE, IN PARTICULAR FOR ROW DECODING AND COLUMN DECODING OF AN EEPROM MEMORY PLANE

BACKGROUND

Technical Field

Embodiments relate to latch devices, more commonly designated by the person skilled in the art under the name "latch", and in particular those used in the non-volatile memories, for example the electrically erasable and programmable memories, called EEPROM memories, and more particularly but not exclusively memories having an architecture of the "split voltage" type for their erasing and their programming.

Description of the Related Art

In the EEPROM memories, the logic value of a bit stored in a memory point is represented by the value of the threshold voltage of a floating gate transistor, which can be modified at will by programming or erasing operations. Programming or erasing a floating gate transistor includes injecting or extracting electrical charges from the transistor gate by tunnel effect ("Fowler-Nordheim" effect) by means of a high voltage.

In erasing, this high voltage can be in the range of 9 to 20 volts, for example 15 volts.

This high voltage, utilized for writing EEPROM memories, is very restrictive in terms of the technological sector and the reliability of the product.

Indeed, the lithographic reduction, that is to say the increase in the fineness of etching, leads to a reduction in the operating voltages, and this high voltage becomes more problematic in terms in particular of leaks from the source/drain junctions of the transistors as well as in terms of stresses on the gate oxides ("gate stress"), or even breakdown of these gate oxides, of the transistors.

Consequently, these risks of premature aging and/or breakdown of the transistors have a direct impact on the reliability of the product. This is why the solution called "split voltage" solution mentioned above can be used. More specifically, a high voltage for programming the memory planes is shared between a positive voltage and a negative voltage such that the difference between the positive voltage and the negative voltage corresponds to a sufficient high programming voltage.

Such a solution allows a relaxation of the stress on the voltage withstand of the transistors.

The non-volatile memories such as the EEPROM memories may utilize latch devices in particular for row decoding (in X) and column decoding (in Y) of the memory plane.

Preferably, such latch devices can be compact (typically one latch per bit line and per word line), withstand the high voltage, and be reliable.

Currently, such latch devices use a 6-transistor scheme of the volatile memory point (SRAM) type.

They are set or reset under the nominal supply voltage Vdd of the integrated circuit, which utilizes a conductivity of the N channels of the NMOS transistors which is much higher than the conductivity of the P channels PMOS transistors.

This conductivity condition is obtained by adjusting the width-to-length ratio (W/L) of the transistors.

However, it is planned in the future to use low-power-consumption memories powered under a voltage Vdd in the range of 1.2 volts or even less.

However, the condition of conductivity mentioned above imposes for slow NMOS transistors and fast PMOS transistors, having a large channel length for the PMOS transistors or else a large channel width for the NMOS transistors.

Also, the transistors may be sized as indicated above in the case where some actually produced transistors turned out to be slow NMOS transistors and/or fast PMOS transistors.

This therefore leads to an increase in the size of the transistors as well as to significant gate capacitances.

Moreover, if some actually produced transistors turned out to be fast NMOS transistors and/or slow PMOS transistors, a slow switching of the latch device between the output of the high voltage and the output of the low voltage and vice versa would be obtained, because the PMOS transistors would then be undersized and would then conduct a very low current Thus, the current latch devices of the SRAM type possibly may not operate at a voltage Vdd which would be equal to the highest value between the threshold voltage of the NMOS transistors and the absolute value of the threshold voltage of the PMOS transistors.

They also have a very unstable operation at a low voltage Vdd in the limit transistor configurations (speed or slowness of the MOS transistors), which leads to an increase in the gate surface and an increase in the risk of breakdown of the gate oxide, as well as in some cases to a long switching time.

BRIEF SUMMARY

A compact latch according to one embodiment may be utilized to overcome these drawbacks. In one embodiment, a compact latch device is capable of operating under a low voltage Vdd, having no current conflict between NMOS and PMOS transistors, and capable of reducing as much as possible the stresses in the gate oxides ("gate stress") of the PMOS transistors.

According to one embodiment, it is proposed to use an RS type latch flip-flop, controllable, entirely CMOS, in combination with a control module capable of managing setting and resetting the flip-flop as well as the values and the time sequencing of the different voltages used by the flip-flop in its different operating phases.

According to one aspect, a latch device is proposed, advantageously integrated within an integrated circuit, having an operating mode in which it is capable, on command, of outputting and maintaining on the output terminal thereof either a high voltage, for example 15 volts, or a low voltage, for example 3.5 volts.

This operating mode can for example be used in the context of erasing non-volatile memory cells of the EEPROM type.

The latch device according to this aspect includes a latch flip-flop capable of being powered between a first supply voltage and a second supply voltage which is lower than the first supply voltage.

The latch flip-flop has first and second latch inputs and a latch output connected to the output terminal of the latch device.

The latch device also includes a control module configured to position the latch flip-flop in a set state or in a reset state when the first supply voltage has a first value (for example a value Vdd equal to 1.2 volts or even less) which is lower than the low voltage. The latch flip-flop is positioned, to confer the high voltage on the first supply voltage and the low voltage on the second supply voltage and to simultaneously output from an output time, at the two flip-flop inputs, two input voltages corresponding in theory to a prohibited logic state, under output conditions such that these two input voltages do not result, in reality for the flip-flop, in the prohibited logic state, so as to output and maintain the high voltage or the low voltage on the flip-flop output (depending on the initial "set" or "reset" positioning of the flip-flop).

A prohibited logic state for an RS flip-flop may result in the simultaneous application of set and reset conditions to the two flip-flop inputs.

When the RS flip-flop includes NOR logic gates, this prohibited logic state results in the application of two voltages to the two flip-flop inputs seen by the NMOS transistors of the flip-flop whose gates are connected to these two flip-flop inputs, as logic states "1".

When the RS flip-flop includes NAND logic gates, this prohibited logic state results in the application of two voltages to the two flip-flop inputs seen by the NMOS transistors of the flip-flop whose gates are connected to these two flip-flop inputs, as logic states "0".

But the conditions for outputting these two input voltages are such that they actually allow avoiding the prohibited logic state.

By way of example, these output conditions include the satisfaction at the output time and subsequently, of a relationship between the values of these two input voltages, the value of the second supply voltage and the threshold voltage of the NMOS transistors of the flip-flop whose gates are connected to the two flip-flop inputs.

According to one embodiment, the high voltage and the low voltage have values corresponding to those used in phases for erasing or programming non-volatile memory cells.

The first value of the first supply voltage is at least equal to the highest value between the threshold voltage of the NMOS transistors and the absolute value of the threshold voltage of the PMOS transistors of the latch device.

It is moreover advantageously less than or equal to 1.2 volts.

According to one embodiment, the latch flip-flop includes a first logic gate and a second logic gate.

Although it is possible to use logic NAND gates, it is simpler to use NOR gates.

According to one embodiment, the first logic gate has a first gate input coupled to the first flip-flop input, a second gate input, and a first gate output.

The second logic gate has a first gate input coupled to the first gate output, a second gate input coupled to the second flip-flop input and a second gate output coupled to the second gate input of the first logic gate as well as to the flip-flop output.

According to one embodiment, the first and second logic gates include NMOS transistors having the gate thereof connected to the first flip-flop input or to the second flip-flop input and the control module is configured to, when the flip-flop is positioned (in its set or reset state), output from the output time, on each flip-flop input the corresponding input voltage having a value which is lower than the value of the second supply voltage increased by the threshold voltage of the NMOS transistors.

According to one embodiment, the first and second logic gates include NMOS transistors having the gate thereof connected to the first flip-flop input or to the second flip-flop input and the control module is configured to, when the flip-flop is positioned (in its set or reset state), output from the output time, on each flip-flop input, the corresponding input voltage having a value lower than the value of the second supply voltage increased by the threshold voltage of the NMOS transistors.

This allows obtaining a gate-source voltage of these transistors which is lower than their threshold voltage, which blocks them and therefore avoids the prohibited logic state of the flip-flop while avoiding the leaks of these NMOS transistors.

It would be possible to output, at the output time and at least temporarily, on each flip-flop input, the input voltage having a value which is equal to the value of the second supply voltage increased by the threshold voltage of the NMOS transistors. A prohibited logic state still would not be obtained because such input voltages would not be seen as representative of a logic "1" state, but this would generate current leakage at the NMOS transistors.

According to one embodiment, the latch flip-flop includes MOS transistors and the control module is configured to, when the latch is positioned (in its set or reset state), output an input voltage to the corresponding flip-flop input, having a value such that the difference between the first supply voltage and the corresponding input voltage is less than a reference value selected to reduce or even eliminate the stresses in the gate oxides ("gate stress") of the MOS transistors.

When the high voltage is equal to 15 volts and the reference value can be taken equal for example to 12 volts.

According to one embodiment, the control module includes a first NAND logic gate, capable of being powered between a first auxiliary voltage and a second auxiliary voltage.

The first logic gate has a first gate input capable of receiving a set logic signal from the latch flip-flop, a second gate input capable of receiving a control signal, and a first gate output (OUTD1) coupled to the first flip-flop input.

The control module also includes a second NAND logic gate, capable of being powered between the first auxiliary voltage and the second auxiliary voltage.

This second NAND logic gate has a first gate input capable of receiving the control signal, a second gate input capable of receiving a reset logic signal from the latch flip-flop, and a second gate output coupled to the second flip-flop input.

The control module also includes monitoring means configured to, depending on different operating phases of the latch flip-flop (for example, flip-flop in the inactive state, setting the flip-flop, resetting the flip-flop, and once the flip-flop is set or reset, output and maintain the high voltage or the low voltage of the latch flip-flop):
  assign a logic value to the control signal;
  output the set signal in its active or inactive logic state;
  output the reset signal in its inactive or active logic state; and
  manage the values of the first supply voltage, of the second supply voltage, of the first auxiliary supply voltage and of the second auxiliary supply voltage.

Thus, according to one embodiment, in order to position the latch flip-flop in its set state, the monitoring means are configured to:
  confer the first value (for example the voltage of 1.2 Volts or even less) on the first auxiliary voltage and on the first supply voltage and a supply cold point value, for example ground, on the second voltage auxiliary and the second supply voltage; and confer, on the control signal, a first logic value enabling an inverted transfer of the set signal, in its active logic state, to the first flip-flop input and of the reset signal, in its inactive logic state, to the second flip-flop input; and in order to position the latch flip-flop in its reset state, the monitoring means configured to:

confer the first value (for example the voltage of 1.2 Volts or even less) on the first auxiliary voltage and on the first supply voltage and a supply cold point value, for example ground, on the second auxiliary voltage and on the second supply voltage; and confer, on the control signal, a first logic value enabling an inverted transfer of the set signal, in its inactive logic state, to the first flip-flop input and of the reset signal, in its active logic state, to the second flip-flop input.

According to one embodiment, once the latch flip-flop is positioned, the monitoring means are configured to increase the value of the second supply voltage and to confer, on the control signal, its second logic value when the value of this second supply voltage becomes greater, advantageously by a few tens of millivolts, than the difference between the first value (for example 1.2 Volts) of the first supply voltage and the threshold voltage of the NMOS transistors of the first and second logic gates.

This switching of the logic value of the control signal occurs at the output time.

According to one embodiment, the monitoring means further include auxiliary means configured to apply the first value (for example 1.2 Volts) of the first supply voltage to the first auxiliary supply voltage as long as the second supply voltage is lower than the first value then to switch the first auxiliary supply voltage to the second supply voltage when the second supply voltage is greater than or equal to the first value.

Thus the flip-flop is set or reset under the first voltage value (1.2 Volts for example) then the first auxiliary voltage which supplies the NAND gates follows the second supply voltage.

According to another aspect, a non-volatile memory device is proposed, including a matrix memory plane including rows and columns of non-volatile memory cells, a row decoder including at least one latch device as defined above and a column decoder including a latch device as defined above.

The memory device may be of conventional architecture or else of the "split voltage" type.

The memory cells are for example EEPROM cells.

BRIEF DESCRIPTION OF THE SEVERAL VIEWS OF THE DRAWINGS

Other advantages and features of the disclosure will appear on examining the detailed description of implementations and embodiments, without limitation, and of the appended drawings in which.

DETAILED DESCRIPTION

Figure 1:
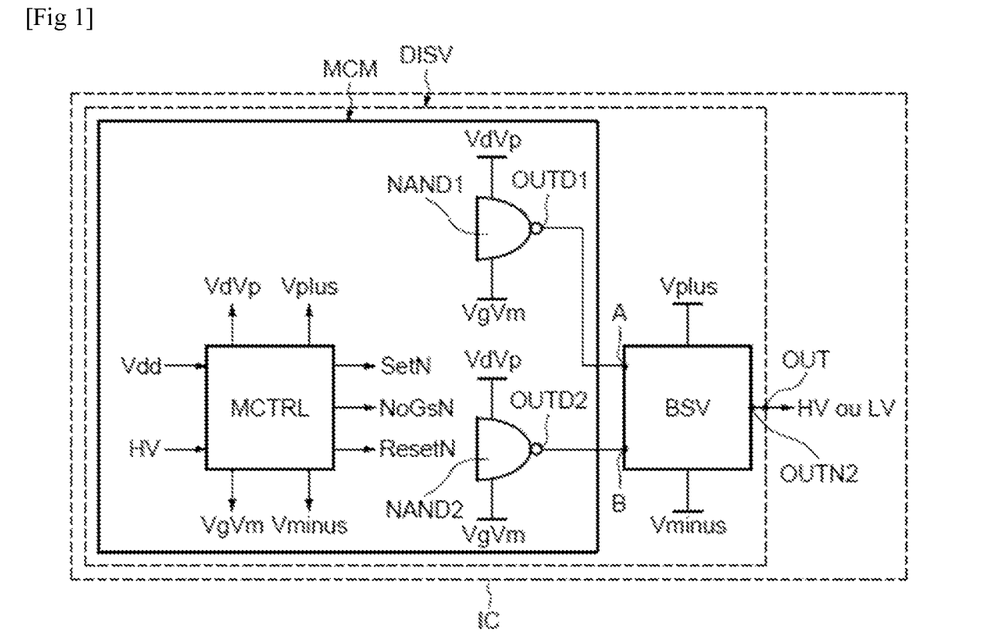
FIG. 1 is a schematic diagram of an integrated circuit including a latch device, according to one embodiment.

In FIG. 1, the reference DISV designates an example of a latch device, for example incorporated within an integrated circuit IC.

This device DISV has an operating mode in which it is capable, on command, of outputting and maintaining, on the output terminal OUT thereof, either a high voltage HV, for example in the range of 15 volts, or a low voltage LV, for example in the range of 3.5 volts.

This device DISV includes an RS type latch flip-flop referenced BSV, powered between a first supply voltage Vplus and a second supply voltage Vminus which is lower than the first supply voltage Vplus and having a first flip-flop input A, a second flip-flop input B and a flip-flop output OUTN2 connected to the output terminal OUT.

Herein, the flip-flop output OUTN2 forms the output terminal OUT of the device DISV.

The device DISV also includes a control module MCM configured to position the latch flip-flop BSV in a set state or in a reset state when the first supply voltage Vplus has a first value Vdd which is lower than the low voltage LV and which can be as low as the highest value between the threshold voltage of the NMOS transistors of the device and the absolute value of the threshold voltage of the PMOS transistors of the device, for example in the range of 0.9 volts.

In other words, the flip-flop BSV is set or reset under the supply voltage Vdd.

The supply voltage Vdd may be a supply voltage of the integrated circuit, provided by a voltage source which is internal or external to the integrated circuit IC.

The high voltage HV can be supplied by a charge pump of conventional structure.

When the flip-flop BSV is positioned in its "set" or "reset" state, the control module is configured to confer the high voltage HV on the first supply voltage Vplus and the low voltage LV on the second supply voltage Vminus and to output and maintain the high voltage HV or the low voltage LV on the flip-flop output OUTN2, depending on the initial positioning state of the flip-flop, while avoiding outputting, at the two flip-flop inputs A and B, a prohibited logic state.

More specifically, the control module is configured to simultaneously output, at an output time and subsequently, at the two flip-flop inputs A and B, two input voltages corresponding in theory to a prohibited logic state, under output conditions such that these two input voltages do not result, in reality for the flip-flop, in the prohibited logic state.

The prohibited logic state is a state which results in the simultaneous application of a set and reset condition to the two flip-flop inputs A and B.

As will be seen in more detail below, in the described example, the flip-flop BSV includes NOR gates.

Consequently, the prohibited logic state results for such a flip-flop, by the application of two voltages to the two flip-flop inputs seen by the NMOS transistors of the flip-flop whose gates are connected to these two flip-flop inputs A and B, as representative of a logic "1" state.

As will be seen in more detail below, the first supply voltage Vplus follows, for example, an increasing ramp of values starting at the value Vdd and up to HV.

The second supply voltage Vminus follows, for example, an increasing ramp of values starting at zero value (the mass) and up to LV.

The control module also includes a first NAND logic gate referenced NAND1, powered between a first auxiliary voltage VdVp and a second auxiliary voltage VgVm, and coupled at the output to the first flip-flop input A.

This first logic gate is capable of receiving a logic signal SetN for setting the latch flip-flop as well as a control signal (NoGsN.

The control module also includes a second NAND logic gate referenced NAND2, powered between the first auxiliary voltage VdVp and the second auxiliary voltage VgVm, and coupled at the output to the second flip-flop input B.

This second logic gate is capable of receiving a logic signal (ResetN) for resetting the latch flip-flop as well as the control signal NoGsN.

The control module MCM also includes monitoring circuitry MCTRL configured to, depending on different operating phases of the latch flip-flop, assign a logic value to the control signal NoGsN, output the set signal SetN in its active or inactive logic state, output the reset signal ResetN in its inactive or active logic state and manage the values of the first supply voltage Vplus, of the second supply voltage Vminus, of the first auxiliary supply voltage VdVp and of the second auxiliary supply voltage VgVm.

This management, performed for example in particular by a state machine, includes a temporal sequencing of these different voltage values.

Figure 2:
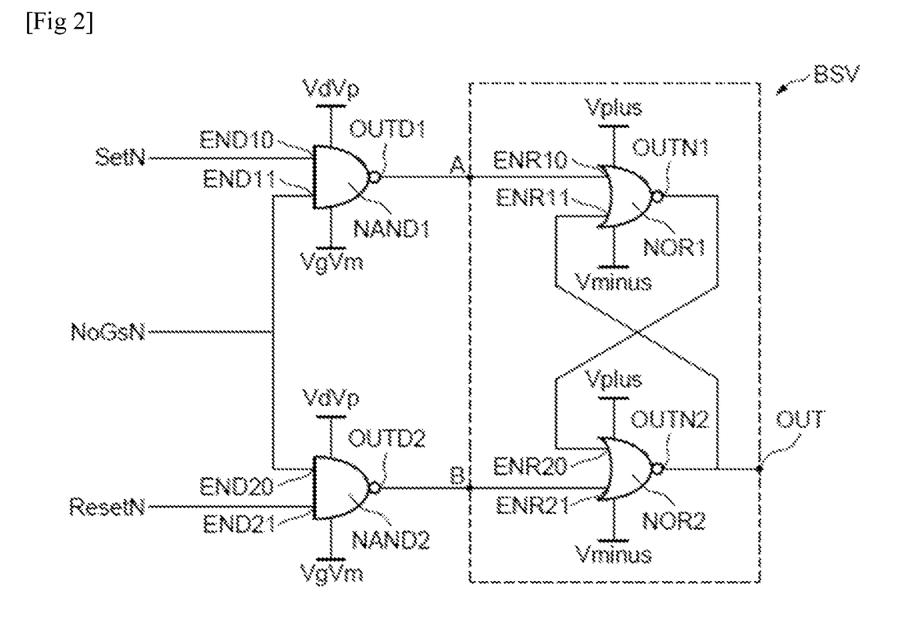
FIG. 2 is a schematic diagram of a latch device, according to one embodiment.

As illustrated more specifically in FIG. 2, the latch flip-flop BSV includes a first logic gate NOR1 and a second logic gate NOR2, which herein are NOR gates.

The first logic gate NOR1 has a first gate input ENR10 coupled to the first flip-flop input A, a second gate input ENR11 and a first gate output OUTN1.

The second logic gate NOR2 has a first gate input ENR20 coupled to the first gate output OUTN1, a second gate input ENR21 coupled to the second flip-flop input B and the second gate output OUTN2 coupled to the second gate input ENR11 of the first logic gate NOR1 as well as to the flip-flop output OUT.

The first NAND logic gate NAND1 has a first gate input END10 capable of receiving the logic signal SetN for setting the latch flip-flop, a second gate input END11 capable of receiving the control signal NoGsN, and a first gate output OUTD1 coupled to the first flip-flop input A.

The second NAND logic gate NAND2 has a first gate input END20 capable of receiving the control signal NoGsN, a second gate input END21 capable of receiving the logic signal ResetN for resetting the latch flip-flop, and a second gate output OUTD2 coupled to the second flip-flop input B.

The first and second logic gates NOR1, NOR2 include NMOS transistors having the gate thereof connected to the first flip-flop input A or to the second flip-flop input B.

Figure 3:
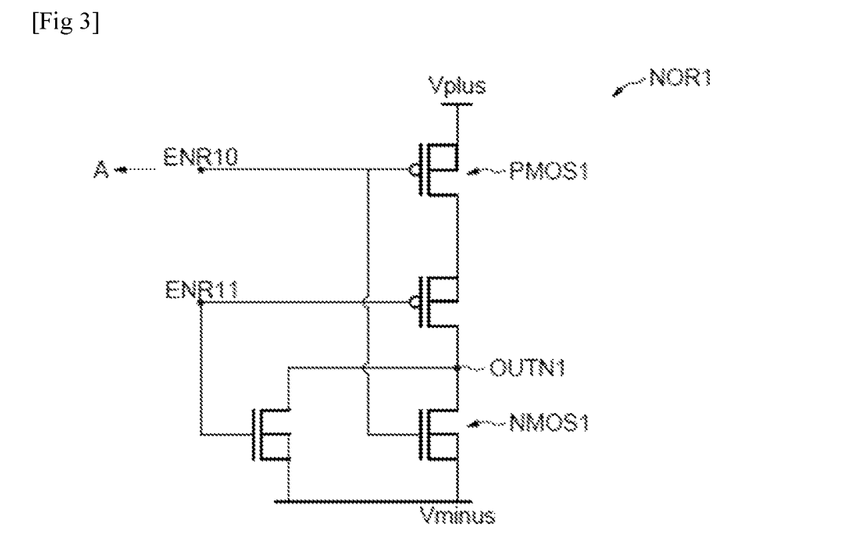
FIG. 3 is a schematic diagram of a NOR gate, according to one embodiment.
Figure 4:
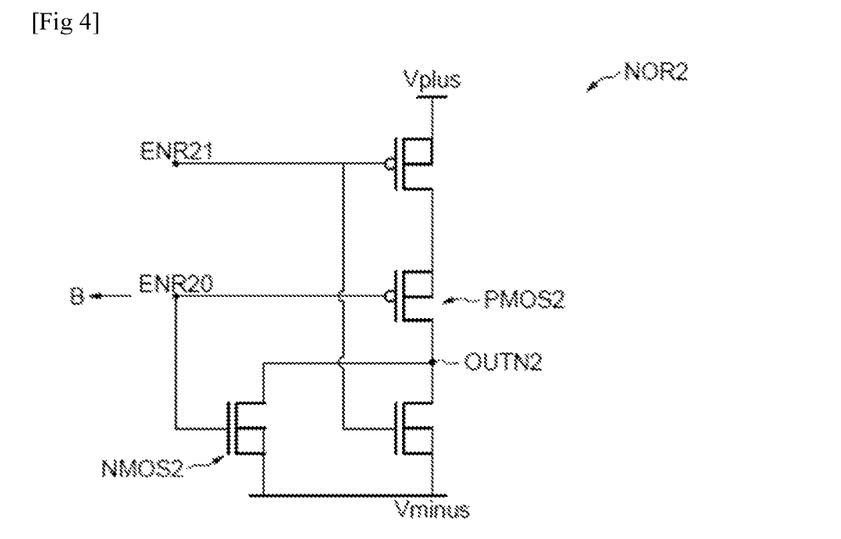
FIG. 4 is a schematic diagram of a NOR gate, according to one embodiment.

This is illustrated in FIGS. 3 and 4 which represent simplified diagrams of exemplary embodiments of NOR gates.

The gate NOR1 includes a PMOS transistor referenced PMOS1 and an NMOS transistor referenced NMOS1, whose gates are connected to the first flip-flop input A.

The source of the transistor NMOS1 is connected to Vminus.

The gate NOR2 includes a PMOS transistor referenced PMOS2 and an NMOS transistor referenced NMOS2, whose gates are connected to the second flip-flop input B.

The source of the transistor NMOS2 is connected to Vminus.

And as will be seen in more detail below, the control module MCM is configured to, when the flip-flop is positioned in its set or reset state, output at an output time and subsequently, a voltage VA, VB on each flip-flop input A, B which is advantageously lower than the value of the second supply voltage Vminus increased by the threshold voltage of the NMOS transistors.

This has the effect of blocking the NMOS transistors of the gates NOR1 and NOR2 whose gates are connected to the two flip-flop inputs A and B (because their source gate voltage is lower than their threshold voltage), and consequently the output of these voltages VA and VB, which are not representative for these transistors of logic states "1", do not constitute, for these gates, an output of a prohibited logic state to the flip-flop BSV.

Furthermore, the NMOS transistors of these NOR gates do not leak.

Figure 5:
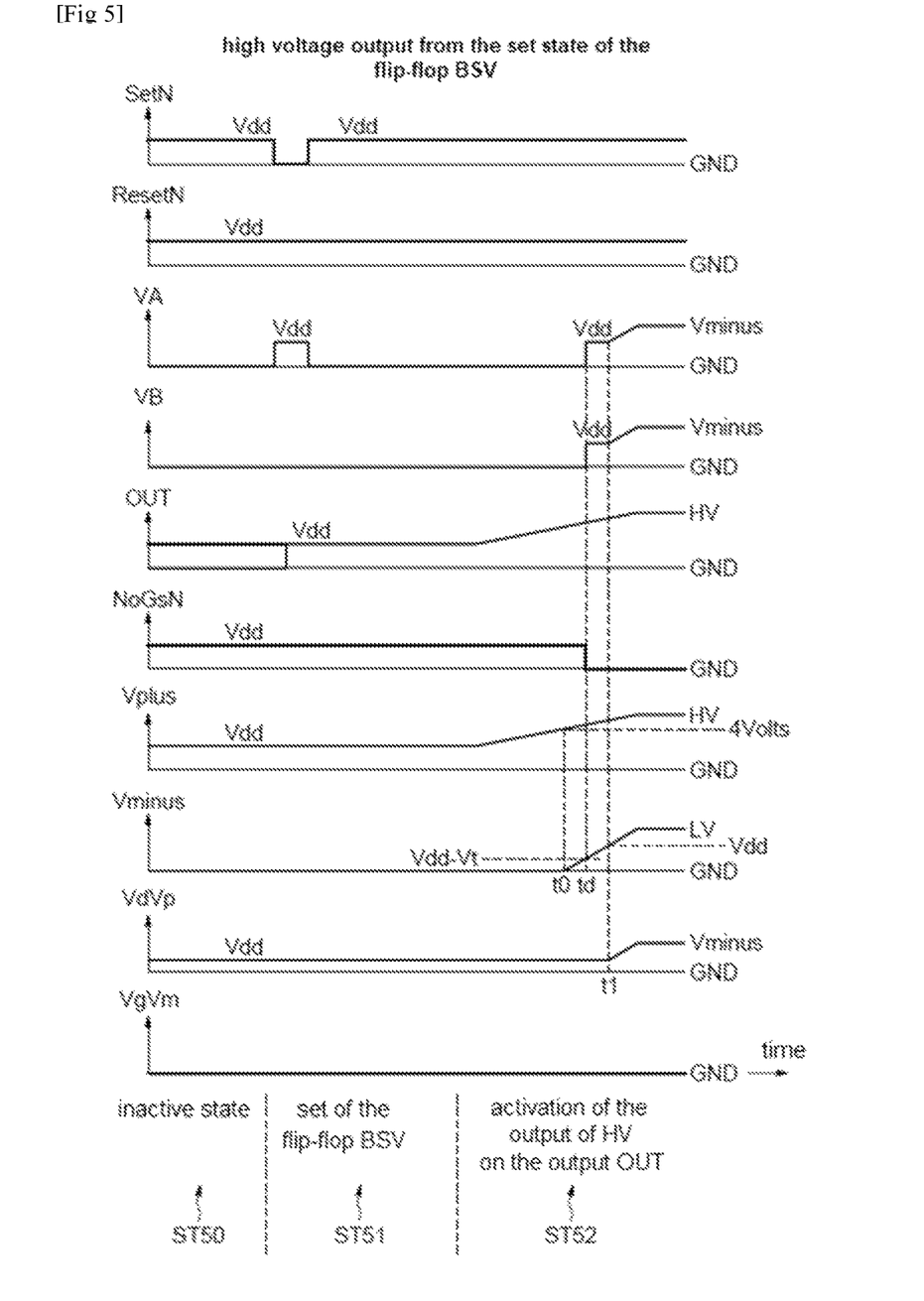
FIG. 5 is a timing diagram of signals associated with a latch device, according to one embodiment.

Reference is now made more particularly to the timing diagram of FIG. 5 to illustrate an example of an operating mode of the device DISV, and more particularly the output and maintenance of the high voltage HV on the output terminal OUT from the set state of the flip-flop BSV.

In the operating phase ST50, the flip-flop is in an idle state.

In this state, the signals SetN and ResetN are inactive (they are at the voltage Vdd; high state).

The control signal NoGsN is also in the high state (Vdd) corresponding to a first logic value "1".

The voltages VdVp, Vplus have the value Vdd and the voltages VgVm, VA, VB and Vminus are zero (ground GND).

The output OUT can output either the zero value or the value Vdd.

The operating phase ST51 is the setting of the flip-flop BSV, that is to say its positioning in the set state.

In order to carry out this setting, the monitoring means MCTRL are configured to:

confer the first value Vdd on the first auxiliary voltage VdVp and on the first supply voltage Vplus and the ground GND to the second auxiliary voltage VgVm and to the second supply voltage Vminus; and confer, on the control signal NoGsN, the first logic value ("1"; Vdd) enabling an inverted transfer of the set signal SetN in its active logic state (grounded SetN; logic state "0") to the first flip-flop input A and the reset signal ResetN in its inactive logic state (RestN at Vdd; logic state "1" to the second flip-flop input B.

The two NAND gates NAND1 and NAND2 behave like inverters.

As a result, the voltage VA applied to the input A of the flip-flop rises to Vdd and the voltage VB applied to the input B of the flip-flop remains grounded.

When the signal SetN becomes inactive again (SetN at Vdd), the flip-flop BSV maintains its set state (the voltage on the output terminal OUT remains at Vdd) and is ready to switch to the high voltage HV in order to output and maintain this high voltage on the output terminal OUT.

This phase of output of the high voltage HV is referenced ST52 on the timing diagram.

The activation of this output phase begins with the rise, monitored by the monitoring means MCTRL, of the first supply voltage Vplus initially to Vdd.

The first auxiliary voltage VdVp is at the beginning of this phase equal to the value Vdd and the second auxiliary voltage VgVm is ground.

As soon as the voltage Vplus reaches a floor value, for example 4 volts (time t0), the monitoring means MCTRL increase the second voltage Vminus, initially grounded, so that it follows the voltage Vplus reduced by this floor value.

The voltage Vminus will then be stabilized at the low voltage LV (herein 3.5 volts) while Vplus will continue to increase to reach the high voltage HV, herein 15 volts.

The monitoring means are also configured to confer, on the control signal NoGsN, its second logic value, herein the logic value "0" when the value of this second supply voltage Vminus becomes greater than the difference (Vdd−Vt) between the first value Vdd of the first supply voltage Vplus and the threshold voltage Vt of the NMOS transistors of the first and second logic gates NOR1, NOR2.

Figure 6:
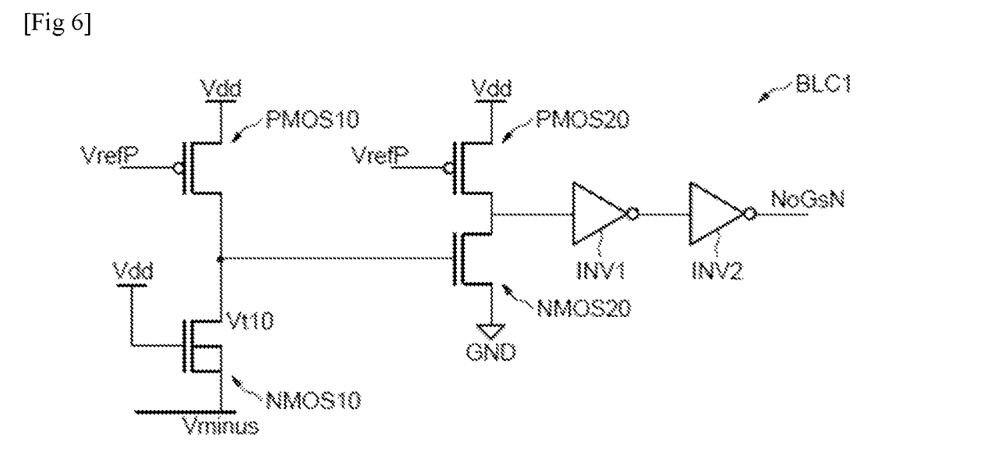
FIG. 6 is a schematic diagram of a monitoring block, according to one embodiment.

In this respect, the monitoring means can incorporate the monitoring block BLC1 of FIG. 6 which illustrates a non-limiting example of a circuit allowing monitoring the value of the control signal NoGsN depending on Vdd.

Of course, other circuits having this functionality are possible.

More specifically, with regard to the block BLC1, a first PMOS transistor, referenced PMOS10, mounted as a current source receives, on the gate thereof, a reference voltage which is equal to Vdd−Vtp, where Vtp designates the threshold voltage of the PMOS transistor.

A first NMOS transistor, referenced NMOS10, has its drain connected to the drain of the first transistor PMOS10, the gate thereof connected to Vdd and the source thereof connected to Vminus.

This first transistor NMOS10 has a threshold voltage Vt10 which is lower by a few tens of millivolts, for example 50 millivolts, than the threshold voltage Vt of the NMOS transistors of the gates NOR1 and NOR2.

This threshold voltage Vt10 which is lower than the threshold voltage Vt can be obtained by making a transistor NMOS10 including several narrow-channel elementary NMOS transistors connected in parallel such that the sum of the channel widths of these elementary transistors is much greater than the channel width of NMOS transistors of the gates NOR1 and NOR2.

A second NMOS transistor, referenced NMOS20, has the gate thereof connected to the drain of the transistor NMOS10, the source thereof connected to ground GND and the drain thereof connected to the drain of a second PMOS transistor, referenced PMOS20, also connected as a current source.

A first inverter INV1 is connected to the drain of the transistor NMOS20 and a second inverter INV2, outputting the control signal NoGsN is connected to the output of the first inverter INV1.

When the voltage Vminus is grounded, the transistor NMOS10 is on and outputs a zero voltage to the gate of the transistor NMOS20, which turns it off.

The voltage Vdd is therefore output at the input of the inverter INV1 and therefore at the output of the inverter INV2, which confers the logic value "1" on the control signal NoGsN.

When voltage Vminus increases and reaches the value Vdd−Vt10, the transistor NMOS10 turns off, turning on the transistor NMOS20, which outputs the zero voltage at the output of the inverter INV2 and switches the control signal NoGsN into its second state logic, herein the logic state "0". This switching occurs at the output time td.

The two NAND gates NAND1 and NAND2, output the input voltage VA on the flip-flop input A and the input voltage VB on the flip-flop input B.

These two voltages VA and VB are equal to the first auxiliary voltage VdVp.

During the switching of the control signal NoGsN, the voltage Vminus equals Vdd-Vt10. But since the threshold voltage Vt10 is lower than the threshold voltage Vt, when switching the control signal NoGsN, the voltage Vminus is higher than Vdd−Vt.

As long as Vminus is greater than Vdd-Vt and less than Vdd, these input voltages VA and VB are equal to Vdd.

Each input voltage VA and VB is therefore in this time range beginning at the output time td, which is lower than the value of the second supply voltage Vminus increased by the threshold voltage Vt of the NMOS transistors of the gates NOR1 and NOR2.

The condition of non-output of a prohibited logic state, at the flip-flop inputs A and B, is therefore well fulfilled with, moreover, the absence of current leaks at the NMOS transistors of the gates NOR1 and NOR2.

When the voltage Vminus reaches the value Vdd (time t1), the monitoring means switch the first auxiliary voltage VdVP to the voltage Vminus so that the voltage VdVP follows this voltage Vminus.

Figure 7:
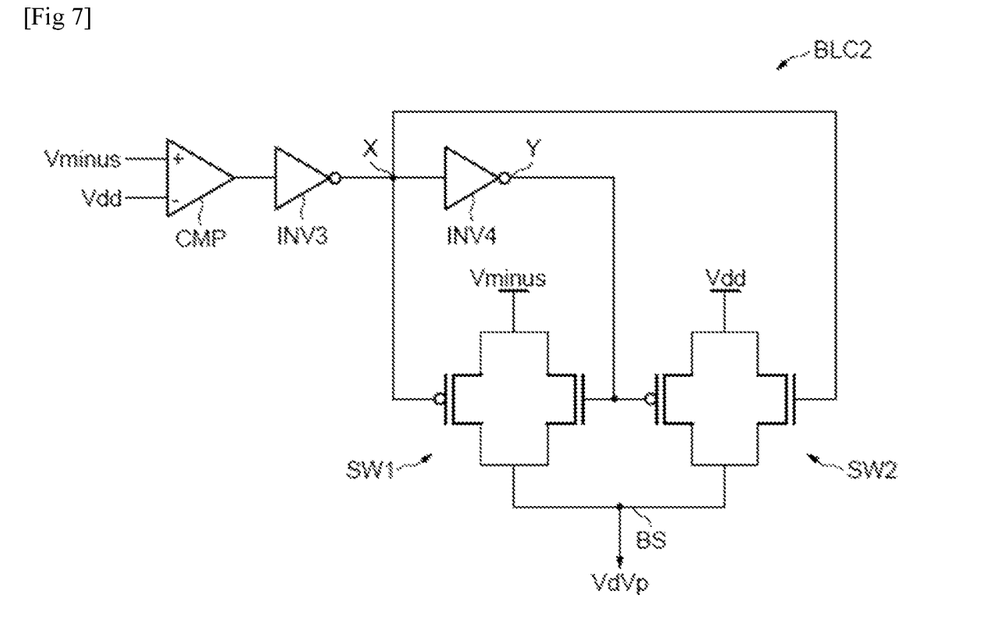
FIG. 7 is a schematic diagram of a monitoring block, according to one embodiment.

This can be carried out using the circuit BLC2 illustrated in FIG. 7.

This circuit includes a comparator receiving, on the two inputs thereof, the voltage Vminus and the voltage Vdd.

The output of the comparator CMP is connected to an inverter INV3 whose output node X is connected to the input of another inverter INV4.

The output node X and output node Y of inverter INV4 are connected to the control inputs of two CMOS switches SW1 and SW2.

The input of the switch SW1 receives the voltage Vminus and the input of the switch SW2 receives the voltage Vdd.

The two outputs of the two switches are connected and output the first auxiliary voltage VdVp on the output node BS.

Thus when Vminus is less than Vdd, the output node BS is connected to Vdd, and the voltage VdVp is equal to Vdd.

When Vminus reaches Vdd, output node BS is connected to Vminus, and the voltage VdVp follows the voltage Vminus.

The two input voltages VA and VB also follow Vminus and consequently remain again lower than Vminus+Vt.

The condition of non-output of a prohibited logic state at the flip-flop inputs A and B is therefore again well fulfilled with, furthermore, blocked NMOS transistors and therefore absence of current leaks at these NMOS transistors of the gates NOR1 and NOR2.

Moreover, the input voltages VA and VB which follow the voltage Vminus have a value such that the difference between the first supply voltage Vplus and the corresponding input voltage VA, VB is less than a chosen reference value to reduce or even eliminate stresses in the gate oxides of the MOS transistors.

This reference value is for example equal to 12 volts.

In other words, the difference between Vplus and VA or VB never exceeds 12 volts.

In the end, the output terminal OUT, whose voltage follows the voltage Vplus, outputs and maintains the high voltage HV.

Figure 8:
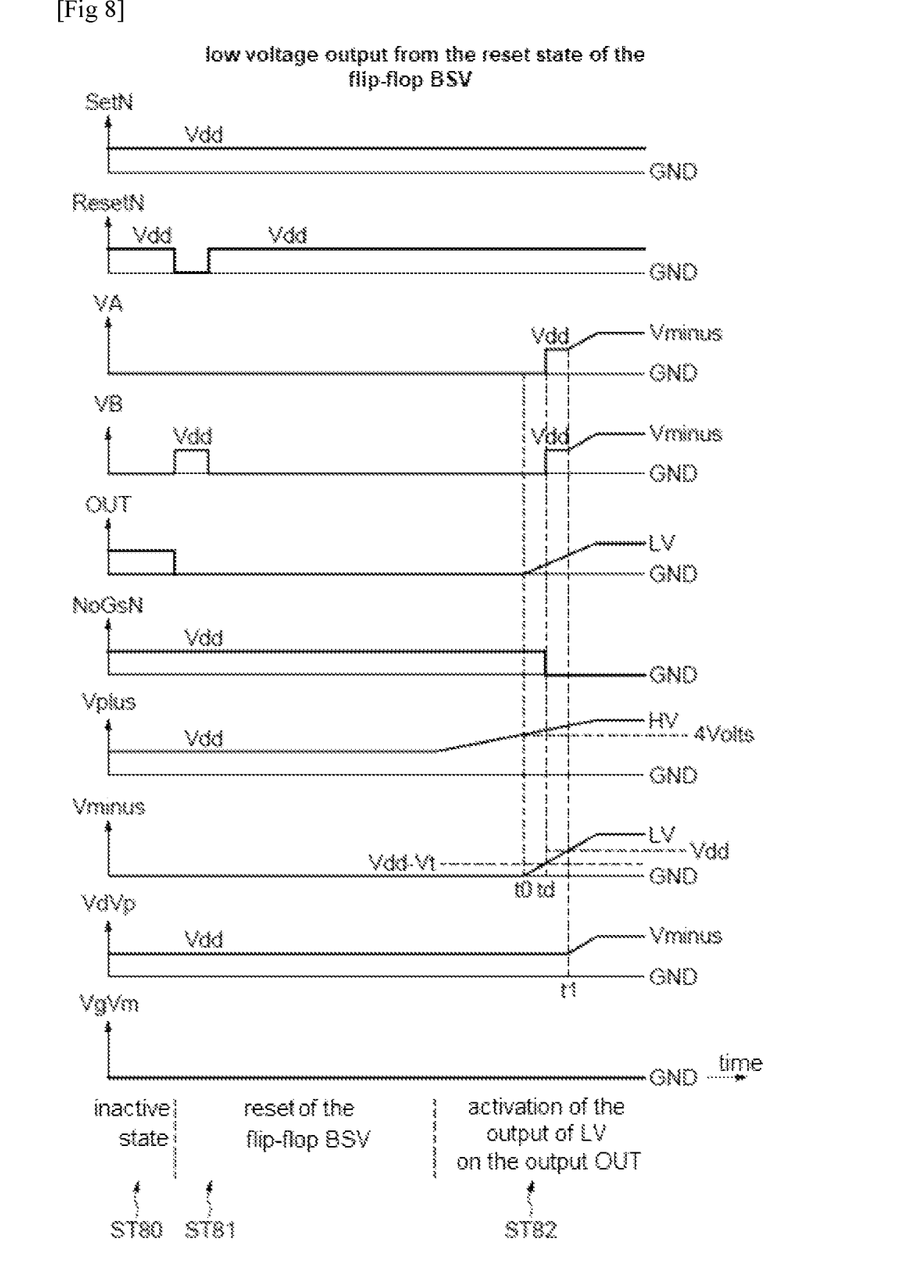
FIG. 8 is a timing diagram of signals associated with a latch device, according to one embodiment.

Reference is now made more particularly to the timing diagram of FIG. 8 to illustrate an example of an operating mode of the device DISV, and more particularly the output and maintenance of the low voltage LV on the output terminal OUT from the reset state of the flip-flop BSV.

In the operating phase ST80, the flip-flop is in an idle state.

In this state, the signals SetN and ResetN are inactive (they are at the voltage Vdd; high state).

The control signal NoGsN is also in the high state (Vdd) corresponding to a first logic value "1".

The voltages VdVp, Vplus have the value Vdd and the voltages VgVm, VA, VB and Vminus are zero (ground GND).

The output OUT can output either the zero value or the value Vdd.

The operating phase ST81 is the reset of the flip-flop BSV, that is to say its positioning in the reset state.

In order to perform this reset, the monitoring means MCTRL are configured to:
confer the first value Vdd on the first auxiliary voltage VdVp and on the first supply voltage Vplus and the ground GND on the second auxiliary voltage VgVm and on the second supply voltage Vminus; and
confer, on the control signal NoGsN, the first logic value ("1"; Vdd) enabling an inverted transfer of the reset signal ResetN, in its active logic state, (grounded ResetN; logic state "0") to the second flip-flop input B and of the set signal SetN, in its inactive logic state, (SetN at Vdd; logic state "1" to the first flip-flop input A.

The two NAND gates NAND1 and NAND2 again behave like inverters.

As a result, the voltage VB applied to the input B of the flip-flop rises to Vdd and the voltage VA applied to the input B of the flip-flop remains grounded.

When the signal ResetN becomes inactive again (ResetN at Vdd) the flip-flop BSV maintains its reset state (the voltage on the output terminal OUT remains at 0) and is ready to switch to the low voltage LV in order to output and maintain this low voltage on the output terminal OUT.

This phase of output of the low voltage LV is referenced ST82 on the timing diagram.

The activation of this output phase begins with the rise, monitored by the monitoring means MCTRL, of the first supply voltage Vplus initially at Vdd.

The first auxiliary voltage VdVp is at the beginning of this phase equal to the value Vdd and the second auxiliary voltage VgVm is ground.

The evolutions of the different voltages, the different switches as well as the satisfaction of the conditions leading to the non-output of a prohibited logic state, explained above with reference to the timing diagram of FIG. 5, apply herein, with the difference that this this time, the evolution of the voltage at the output terminal OUT follows that of the voltage Vminus.

In the end, the output terminal OUT therefore outputs and maintains the low voltage LV.

Figure 9:
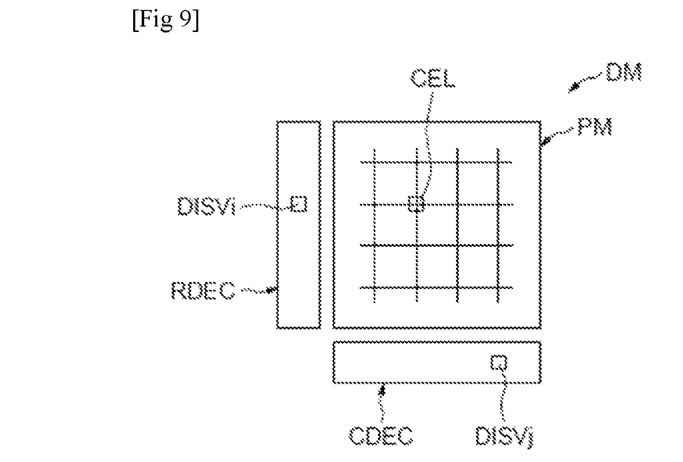
FIG. 9 is a black diagram of non-volatile memory device, according to one embodiment.

Such latch devices DISVi, DISVj can be incorporated in a row decoder RDEC and in a column decoder CDEC (FIG. 9) of a non-volatile memory device DM, including a matrix memory plane PM including rows and columns of non-volatile memory cells CEL, for example EEPROM cells.

Figure 10:
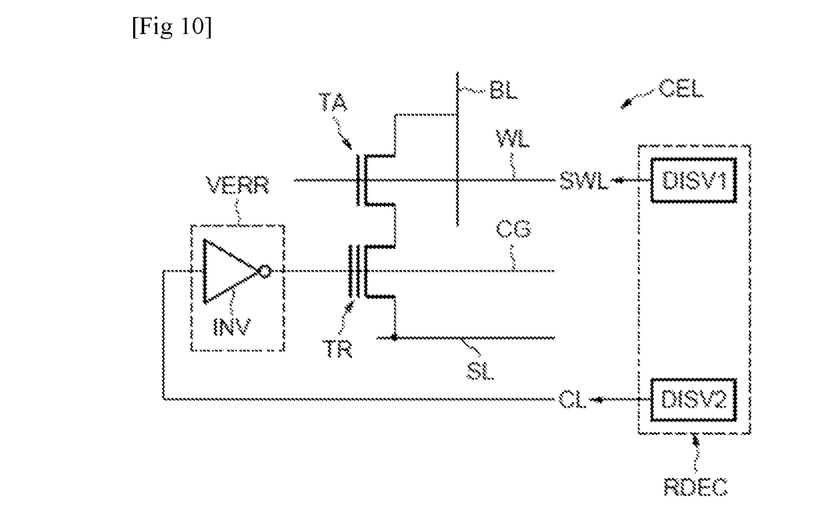
FIG. 10 is a schematic diagram of a memory cell, according to one embodiment.

The architecture of the memory device can be conventional or else of the so-called "split voltage" type as illustrated very schematically in FIG. 10.

The person skilled in the art might possibly refer to the French patent published under the No. 3029000 which also illustrates an example of a conventional memory cell and an example of a "split voltage" type memory cell.

In this FIG. 10, each memory cell CEL includes an access transistor TA and a state transistor TR having a floating gate and a control gate.

All access transistors TA of the same row of cells are connected, by the respective gate thereof, to a word line WL and are controlled, on the gate thereof, by a signal SWL output by a latch device DISV1.

The source of the state transistor TR is connected to a controlled source line SL whose potential is typically grounded (GND) during the erasing or reading phases, but which is positive of in the range of a few volts during the programming operations.

All state transistors TR of the same word of a row of cells are connected, by the respective gate thereof, to a line of CG and are controlled, on the gate thereof, via a latch VERR including an inverter INV and monitored by a signal CL output by a latch device DISV2.

Generally, there are several words in a row and one latch per word. However, the signal CL which monitors all latches of this row is unique for this row.

In a conventional architecture, the signal SWL also controls the control gate of the state transistor via a control element, such as another transistor.

Figure 11:
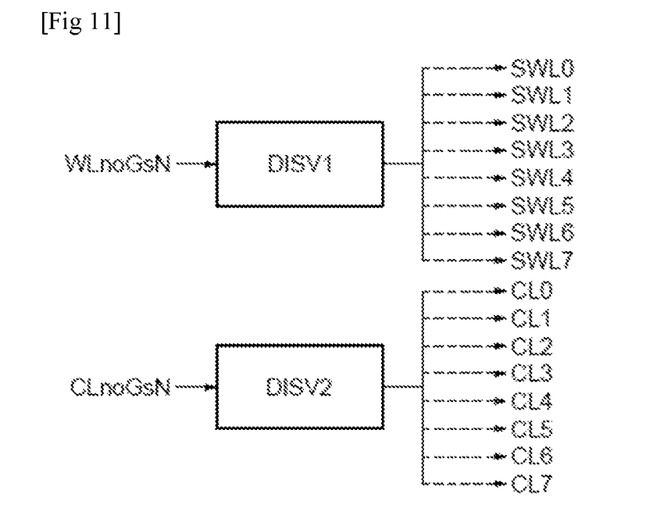
FIG. 11 is a block diagram of latch devices, according to one embodiment. schematically illustrate embodiments and implementations of the disclosure.

As illustrated very schematically in FIG. 11, it is possible to have a latch device DISV1, controlled by the control signal WLnoGsN, per group of word lines, for example per group of 8 word lines, so as to output the signals SWL0-SWL7, and a latch device DISV2, controlled by the control signal CLnoGsN, per group of lines CG, for example per group of 8 lines CG, so as to output the signals CL0-CL7.

It is thus possible to use these latch devices DISV1 to switch between a low voltage, for example 3 volts, (non-selected row) and a high voltage, for example 14 volts, (selected row) during a programming phase of the memory.

It is also possible to use these latch devices DISV2 to switch between a low voltage, for example 3.5 volts (selected row) and a high voltage, for example 15 volts, (non-selected row) during an erasing phase of the memory.

However, the latch devices DISV2 can have another operating mode in which they switch between a positive voltage, for example 4 volts (selected row) and a negative voltage, for example −5 volts, (non-selected row) during a programming phase of the memory.

A latch device, having an operating mode in which it is capable on command of outputting and maintaining, on the output terminal (OUT) thereof, either a high voltage (HV) or a low voltage (LV) may be summarized as including an RS type latch flip-flop (BSV) capable of being supplied between a first supply voltage (Vplus) and a second supply voltage (Vminus) which is lower than the first supply voltage and having first (A) and second (B) flip-flop inputs and a flip-flop output (OUTN2) connected to the output terminal (OUT), and a control module (MCM) configured to position the latch flip-flop in a set state or in a reset state when the first supply voltage (Vplus) has a first value (Vdd) which is lower than the low voltage (LV) then, the latch flip-flop being positioned, to confer the high voltage (HV) on the first supply voltage (Vplus) and the low voltage (LV) on the second supply voltage (Vminus) and to simultaneously output from an output time (td), at the two flip-flop inputs, two input voltages (VA, VB) corresponding in theory to a prohibited logic state, under output conditions such that these two input voltages (VA, VB) do not result, in reality for the flip-flop, in the prohibited logic state, so as to output and maintain the high voltage (HV) or the low voltage (LV) on the flip-flop output.

The high voltage (HV) and the low voltage (LV) may have values corresponding to those used in the phases for erasing/programming non-volatile memory cells.

The device may include NMOS transistors and PMOS transistors, wherein the first value (Vdd) of the first supply voltage (Vplus) is at least equal to the highest value between the threshold voltage of the NMOS transistors and the absolute value of the threshold voltage of the PMOS transistors, and less than or equal to 1.2 Volts.

The latch flip-flop (BSV) may include a first logic gate (NOR1) and a second logic gate (NOR2), the first logic gate (NOR1) having a first gate input (ENR10) coupled to the first flip-flop input (A), a second gate input (ENR11) and a first gate output (OUTN1), and the second logic gate (NOR2) having a first gate input (ENR20) coupled to the first gate output (OUTN1), a second gate input (ENR21) coupled to the second flip-flop input (B) and a second gate output (OUTN2) coupled to the second gate input (ENR11) of the first logic gate (NOR1) as well as to the flip-flop output (OUT).

The first logic gate (NOR1) and the second logic gate (NOR2) may be NOR gates.

The first and second logic gates (NOR1, NOR2) may include NMOS transistors having the gate thereof connected to the first flip-flop input (A) or to the second flip-flop input (B) and the control module is configured to, when the flip-flop is positioned, output from the output time (td) on each flip-flop input (A, B), the corresponding input voltage (VA, VB) having a value which is lower than the value of the second supply voltage (Vminus) increased by the threshold voltage of the NMOS transistors.

The latch flip-flop may include MOS transistors and the control module is configured to, when the latch is positioned, output an input voltage (VA, VB) to the corresponding flip-flop input, having a value such that the difference between the first supply voltage (Vplus) and the corresponding input voltage (VA, VB) is less than a reference value selected to reduce or even eliminate the stresses in the gate oxides of the MOS transistors.

The high voltage may be equal to 15 volts and the reference value is equal to 12 volts.

The control module may include a first NAND logic gate (NAND1), capable of being supplied between a first auxiliary voltage (VdVp) and a second auxiliary voltage (VgVm), having a first gate input (END10) capable of receiving a logic signal (SetN) for setting the latch flip-flop, a second gate input (END11) capable of receiving a control signal (NoGsN), and a first gate output (OUTD1) coupled to the first flip-flop input (A); a second NAND logic gate (NAND2), capable of being supplied between the first auxiliary voltage (VdVp) and the second auxiliary voltage (VgVm), having a first gate input (END20) capable of receiving the control signal (NoGsN), a second gate input (END21) capable of receiving a logic signal (ResetN) for resetting the latch flip-flop, and a second gate output (OUTD2) coupled to the second flip-flop input (B); and monitoring means configured to, depending on different operating phases of the latch flip-flop, assign a logic value to the control signal, output the set signal in its active or inactive logic state, output the reset signal in its inactive or active logic state and manage the values of the first supply voltage (Vplus), of the second supply voltage (Vminus), of the first auxiliary supply voltage (VdVp) and of the second auxiliary supply voltage (VgVm).

In order to position the latch flip-flop in its set state, the monitoring means may be configured to confer the first value (Vdd) on the first auxiliary voltage (VdVp) and on the first supply voltage (Vplus) and a supply cold point value (GND) on the second auxiliary voltage (VgVm) and on the second supply voltage (Vminus), and confer, on the control signal (NoGsN), a first logic value enabling an inverted transfer of the set signal, in its active logic state, to the first flip-flop input and of the reset signal, in its inactive logic state, to the second flip-flop input; and in order to position the latch flip-flop in its reset state, the monitoring means may be configured to confer the first value (Vdd) on the first auxiliary voltage (VdVp) and on the first supply voltage (Vplus) and a supply cold point value (GND) on the second auxiliary voltage (VgVm) and on the second supply voltage (Vminus), and confer, on the control signal (NoGsN), a first logic value enabling an inverted transfer of the set signal, in its inactive logic state, to the first flip-flop input and of the reset signal, in its active logic state, to the second flip-flop input.

Once the latch flip-flop is positioned, the monitoring means may be configured to increase the value of the second supply voltage (Vminus) and to confer, on the control signal (NoGsN), its second logic value when the value of this second supply voltage (Vminus) becomes greater than or equal to the difference between the first value (Vdd) of the first supply voltage (Vplus) and the threshold voltage of the NMOS transistors of the first and second logic gates (NOR1, NOR2).

The monitoring means may further include auxiliary means configured to apply the first value (Vdd) of the first supply voltage (Vplus) to the first auxiliary supply voltage (VdVp) as long as the second supply voltage (Vminus) is lower than the first value (Vdd) then to switch the first auxiliary supply voltage (VdVp) to the second supply voltage (Vminus) when the second supply voltage (Vminus) is greater than or equal to the first value (Vdd).

The device may be incorporated within an integrated circuit.

A non-volatile memory device, may be summarized as including a matrix memory plane including rows and columns of non-volatile memory cells, a row decoder including at least one latch device and a column decoder including a latch device.

The device may have an architecture of the "split voltage" type.

The memory cells may be EEPROM cells.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A latch device, comprising:
an RS type latch flip-flop configured to be supplied with a first supply voltage and a second supply voltage lower than the first supply voltage and having first and second flip-flop inputs and a flip-flop output configured to output either a high voltage or a low voltage, wherein the latch flip-flop includes a first logic gate and a second logic gate, the first logic gate having a first gate input coupled to the first flip-flop input, a second gate input and a first gate output, the second logic gate having a first gate input coupled to the first gate output, a second gate input coupled to the second flip-flop input and a second gate output coupled to the second gate input of the first logic gate as well as to the flip-flop output, wherein the first and second logic gates include NMOS transistors having the gate thereof connected to the first flip-flop input or to the second flip-flop input and a control module is configured to, when the flip-flop is placed in a set or reset state, output at an output time on each flip-flop input, the corresponding input voltage having a value which is lower than the value of the second supply voltage increased by a threshold voltage of the NMOS transistors; and the control module configured to place the latch flip-flop in the set state or in the reset state when the first supply voltage has a first value which is lower than the low voltage, to confer the high voltage on the first supply voltage and the low voltage on the second supply voltage and to simultaneously output from the output time, at the two flip-flop inputs, two input voltages corresponding to a prohibited logic state, under output conditions wherein the control module causes the latch flip-flop to output and maintain the high voltage or the low voltage on the flip-flop output in the prohibited state.

2. The device according to claim 1, wherein the high voltage and the low voltage have values corresponding to those used in phases for erasing/programming non-volatile memory cells.

3. The device according to claim 1, comprising PMOS transistors, wherein the first value of the first supply voltage is at least equal to a highest value between the threshold voltage of the NMOS transistors and an absolute value of the threshold voltage of the PMOS transistors, and less than or equal to 1.2 Volts.

4. The device according to claim 1, wherein the first logic gate and the second logic gate are NOR gates.

5. The device according to claim 1, wherein the latch flip-flop includes MOS transistors and the control module is configured to, when the latch is placed in the set or reset state, output an input voltage to the corresponding flip-flop input, having a value wherein the difference between the first supply voltage and the corresponding input voltage is less than a reference value selected to reduce or even eliminate stresses in the gate oxides of the MOS transistors.

6. The device according to claim 5, wherein the high voltage is equal to 15 volts and the reference value is equal to 12 volts.

7. The device according to claim 1, wherein the control module includes:
a first NAND logic gate, configured to be supplied with a first auxiliary voltage and a second auxiliary voltage, having a first gate input capable of receiving a logic signal for setting the latch flip-flop, a second gate input capable of receiving a control signal, and a first gate output coupled to the first flip-flop input;
a second NAND logic gate, configured to be supplied with the first auxiliary voltage and the second auxiliary voltage, having a first gate input capable of receiving the control signal, a second gate input capable of receiving a logic signal for resetting the latch flip-flop, and a second gate output coupled to the second flip-flop input; and monitoring circuitry configured to, depending on different operating phases of the latch flip-flop, assign a logic value to the control signal, output the set signal in its active or inactive logic state, output the reset signal in its inactive or active logic state and manage the values of the first supply voltage, of the second supply voltage, of the first auxiliary supply voltage and of the second auxiliary supply voltage.

8. The device according to claim 7, wherein,
in order to place the latch flip-flop in the set state, the monitoring circuitry is configured to confer the first value on the first auxiliary voltage and on the first supply voltage and a supply cold point value on the second auxiliary voltage and on the second supply voltage, and confer on the control signal, a first logic value enabling an inverted transfer of the set signal, in its active logic state, to the first flip-flop input and of the reset signal, in its inactive logic state, to the second flip-flop input, and
in order to place the latch flip-flop in the reset state, the monitoring circuitry is configured to confer the first value on the first auxiliary voltage and on the first supply voltage and a supply cold point value on the second auxiliary voltage and on the second supply voltage, and confer on the control signal, a first logic value enabling an inverted transfer of the set signal, in its inactive logic state, to the first flip-flop input and of the reset signal, in its active logic state, to the second flip-flop input.

9. The device according to claim 7, wherein once the latch flip-flop is positioned, monitoring means are configured to increase the value of the second supply voltage and to confer, on the control signal, its second logic value when the value of this second supply voltage becomes greater than or equal to the difference between the first value of the first supply voltage and the threshold voltage of the NMOS transistors of the first and second logic gates.

10. The device according to claim 9, wherein the monitoring means further include auxiliary means configured to apply the first value of the first supply voltage to the first auxiliary supply voltage as long as the second supply voltage is lower than the first value then to switch the first auxiliary supply voltage to the second supply voltage when the second supply voltage is greater than or equal to the first value.

11. The device according to claim 1, incorporated within an integrated circuit.

12. A non-volatile memory device, comprising:
a matrix memory plane including rows and columns of non-volatile memory cells; and
a row decoder including a first latch device; and
a column decoder including a second latch device, the first latch device including:
an RS type latch flip-flop configured to be supplied with a first supply voltage and a second supply voltage lower than the first supply voltage and having first and second flip-flop inputs and a flip-flop output configured to output either a high voltage or a low voltage; and
a control module configured to place the latch flip-flop in a set state or in a reset state when the first supply voltage has a first value which is lower than the low voltage, to confer the high voltage on the first supply voltage and the low voltage on the second supply voltage and to simultaneously output from an output time, at the two flip-flop inputs, two input voltages corresponding to a prohibited logic state, under output conditions wherein the control module causes the latch flip-flop to output and maintain the high voltage or the low voltage on the flip-flop output in the prohibited state; wherein the control module includes:
a first NAND logic gate, configured to be supplied with a first auxiliary voltage and a second auxiliary voltage, having a first gate input capable of receiving a logic signal for setting the latch flip-flop, a second gate input capable of receiving a control signal, and a first gate output coupled to the first flip-flop input;
a second NAND logic gate, configured to be supplied with the first auxiliary voltage and the second auxiliary voltage, having a first gate input capable of receiving the control signal, a second gate input capable of receiving a logic signal for resetting the latch flip-flop, and a second gate output coupled to the second flip-flop input; and
monitoring circuitry configured to, depending on different operating phases of the latch flip-flop, assign a logic value to the control signal, output the set signal in its active or inactive logic state, output the reset signal in its inactive or active logic state and manage the values of the first supply voltage, of the second supply voltage, of the first auxiliary supply voltage and of the second auxiliary supply voltage.

13. The non-volatile memory device according to claim 12, including an architecture of a "split voltage" type.

14. The non-volatile memory device according to claim 12, wherein the memory cells are EEPROM cells.

15. A method, comprising:
supplying a first supply voltage to an RS type latch flip-flop of a latch device, wherein the latch flip-flop includes a first logic gate and a second logic gate, the first logic gate having a first gate input coupled to the first flip-flop input, a second gate input and a first gate output, the second logic gate having a first gate input coupled to the first gate output, a second gate input coupled to the second flip-flop input and a second gate output coupled to the second gate input of the first logic gate as well as to a flip-flop output, wherein the first and second logic gates include NMOS transistors having the gate thereof connected to the first flip-flop input or to the second flip-flop input;
supplying a second supply voltage lower than the first supply voltage to the flip-flop;
outputting, from an output of the flip-flop, either a high voltage or a low voltage;
having first and second flip-flop inputs and the flip-flop output configured to output either a high voltage or a low voltage;
placing, with a control module, the flip-flop in a set state or a reset state with the first supply voltage has a first value which is lower than the low voltage;
providing the high voltage as the first supply voltage and the low voltage as the second supply voltage;
providing, from the control module, two input voltages to two inputs of the flip-flop, the two inputs corresponding to a prohibited logic state; and
causing, with the control module, the latch flip-flop to output and maintain the high voltage or the low voltage on the flip-flop output in the prohibited state; and
outputting, with the control module at an output time on each flip-flop input, when the flip-flop is placed in the set or reset state, the corresponding input voltage having a value which is lower than the value of the second supply voltage increased by a threshold voltage of the NMOS transistors.

16. The method of claim 15, comprising using the high voltage and the low voltage to program non-volatile memory cells, erasing/programming non-volatile memory cells.

17. The method of claim 16, wherein the latch device includes PMOS transistors, and wherein the first value of the first supply voltage is at least equal to a highest value between the threshold voltage of the NMOS transistors and an absolute value of the threshold voltage of the PMOS transistors, and less than or equal to 1.2 Volts.

* * * * *